June 5, 1945. W. H. KIDD 2,377,634
SUGAR REFINING CONTROL
Filed Jan. 11, 1941
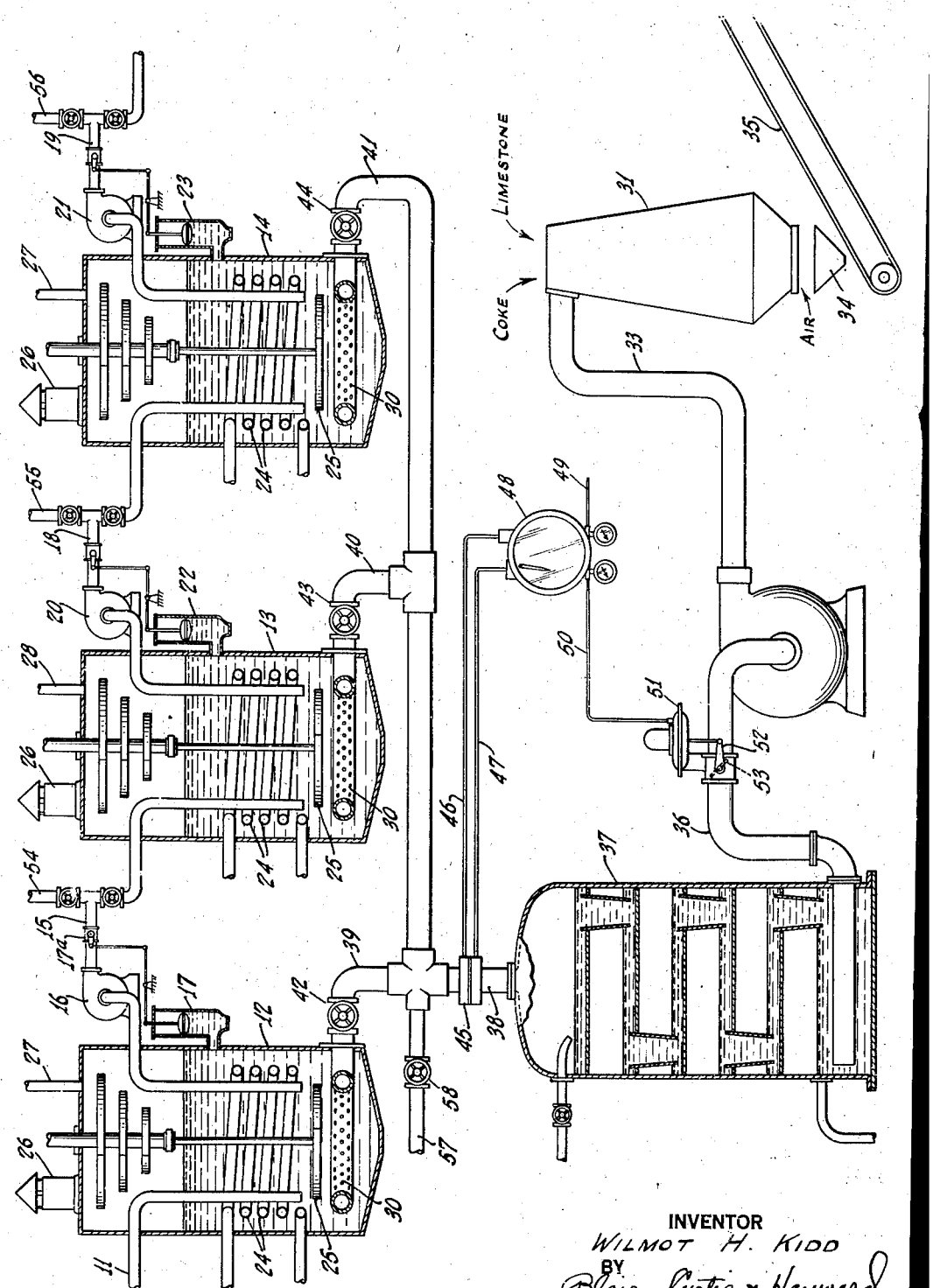
INVENTOR
WILMOT H. KIDD
BY
Blair, Curtis & Hayward
ATTORNEYS Patented June 5, 1945

2,377,634

UNITED STATES PATENT OFFICE 2,377,634

SUGAR REFINING CONTROL

Wilmot H. Kidd, Sharon, Mass., assignor to The Foxboro Company, Foxboro, Mass., a corporation of Massachusetts Application January 11, 1941, Serial No. 374,023

4 Claims. (Cl. 127—50)

This invention relates to the refining of sugar and more particularly to a method and apparatus for controlling the carbonation of a limed solution of raw or incompletely refined sugar. It is an object of the invention to secure more efficient carbonation of such a solution.

The many objects and advantages of the present invention may best be appreciated by referring to the accompanying drawing which shows diagrammatically apparatus capable of carrying out the method of the present invention. The specific embodiment shown in the drawing will be described as applied to the carbonation of raw beet juice in a beet sugar refining process although it will be apparent that both method and apparatus may be used in the refining of other types of sugar solutions.

In the operation of a beet sugar plant the raw beets are commonly washed, sliced, and then passed through a diffusion battery wherein the sugar is leached from the slices by hot water and weak sugar solutions. One of the difficulties of the refining process is the fact that materials other than sugar, such as organic acids and their metallic salts, mineral acids and salts, decomposition products of the cell structure, and the like, may be leached from the beet slices in the diffusion battery.

To remove certain of these impurities from the sugar solution, the raw beet juice is commonly subjected to a process known as carbonation. The hot raw juice from the diffusion battery is measured, heated, and pumped to a primary carbonation unit. Either in the carbonation unit itself or before the juice reaches the carbonation unit it is treated with an excess of lime which neutralizes any acids that may be present. In the carbonation unit, carbon dioxide gas from a suitable source is passed through the solution, thus causing a flocculent precipitation of calcium carbonate which carries down with it certain of the impurities such as, for example, impurities colloidally suspended in the solution. The precipitated calcium carbonate, as well as the impurities associated therewith, may be subsequently separated from the solution by sedimentation and filtration. The present invention provides method and apparatus for more efficiently controlling a carbonation process of this type.

Referring to the drawing, raw juice from a diffusion battery (not shown) is treated with lime and pumped through pipe 11 to a carbonation unit comprising a series of tanks 12, 13, and 14 which may be similarly constructed. The carbonation unit shown may be operated either as a continuous process or as a batch process and the continuous process will be described first. Raw juice is continuously pumped through pipe 11 to carbonating tank 12 and is continuously withdrawn from tank 12 through a transfer pipe 15 and pumped to tank 13 by a transfer pump 16. Tank 12 may be provided as shown with a suitable liquid level regulator 17 which regulates a valve 17a in transfer pipe 15 to maintain a desired level of solution in the tank.

Similar transfer lines 18 and 19, transfer pumps 20 and 21 and liquid level regulators 22 and 23 are provided in connection with tanks 13 and 14 for continuously transferring solution from tank 13 to tank 14 and from tank 14 to a sedimentation or filtration unit (not shown). The tanks 12, 13, and 14 may be provided as shown with heating coils 24, stirring paddles or agitators 25, and vent pipes 26. Agitators 25 may be driven by any suitable means (not shown) and may be provided not only with paddles for agitating the solution but also with paddles located above the liquid level to aid in destroying any foam that might be formed above the liquid. Tanks 12, 13, and 14 are also provided with pipes 27, 28, and 29, respectively, through which milk-of-lime suspension or recycled sugar solutions, such as saccharate solutions, may be supplied to the respective tanks.

Each of the tanks 12, 13, and 14 receives a continuous supply of carbon dioxide gas from a suitable source, the gas being dispersed through the sugar solution by means of perforated rings or spargens 30. The gas bubbles up through the solution in the tank and reacts with the lime suspension to precipitate calcium carbonate as described above.

As shown in the drawing, the source of carbon dioxide gas may be a lime kiln 31 of well-known construction. The kiln 31 is charged with limestone and coke in the usual manner and air for combustion is drawn into the bottom of the kiln by suction which may be provided by a suitable pump or blower 32 located in the exhaust gas line 33 from the kiln. Calcined lime from the kiln 31 falls into a hopper 34 from which it is carried by a conveyor belt 35 to a lime slaker (not shown) for conversion into a milk-of-lime suspension. The exhaust gas from the kiln passing through the line 33 contains a proportion of carbon dioxide gas which remains fairly constant so long as the operation of the kiln is reasonably uniform.

Blower 32 pumps the gas through a discharge pipe 36 to a water scrubber 37 of well-known type where dust is removed from the gas and the gas is cooled. From the scrubber 37, the cleaned gas passes through pipe 38 and branch pipes 39, 40, and 41 to the perforated rings 30 of the carbonating tanks and thence into the sugar solution as described above. Branch pipes 39, 40, and 41 are provided with shut-off valves 42, 43, and 44, respectively.

In operating carbonation equipment of the type described, it is desirable that the solution be maintained somewhat on the alkaline side. In continuous carbonation plants, the lime is usually added to the raw juice as milk-of-lime by some suitable continuous flow mechanism such as a variable speed dipping bucket and it is desirable that the carbon dioxide gas flow be regulated to maintain the pH of the juice in the carbonation tank at a desired value which may, for example, be approximately equivalent to 1.5 grams of calcium oxide per liter. Under conditions of manual operation of the carbonation unit, it may require the full time attention of an operator to keep a hand-operated gas valve properly adjusted for a given rate of milk-of-lime addition. Commonly with manual operation the pH of the carbonation liquor is found to vary as much as two to three pH units.

The present invention provides automatic control of the flow of gas to the carbonation tank to provide more uniform and more efficient carbonation. Located in pipe 38 there is an orifice plate 45 which serves to create in pipe 38 a differential pressure which is a function of the volume of gas flowing therethrough. This differential pressure is transmitted through pipes 46 and 47 to a flow controller 48. The differential pressure measuring element of the flow controller 48 may be of the type described in Bristol Patent 1,592,415 issued July 13, 1926. The flow controller 48 may advantageously have incorporated therein control mechanism of the type described in Mason Reissue Patent 20,092, reissue September 1, 1936. The controller mechanism operates to produce a pneumatic pressure which is a function of the differential pressure produced by the orifice restriction 45 and hence is a function of the rate of gas flow through the pipe 38.

Compressed air to operate the controller 48 is supplied through an air pipe 49 from a suitable source (not shown). The controlled pneumatic pressure produced by the controller 48 communicates through a pipe 50 with a pneumatic diaphragm motor 51 which is connected by a lever 52 to a suitable valve, such as the butterfly valve 53, in the pipe 36. Valve 53 regulates the rate of flow of gas in pipe 36 and hence the rate at which gas is permitted to flow to the carbonation tanks 12, 13, and 14. The control point of flow controller 48 is made adjustable in well-known manner so that the flow of gas to the carbonation tanks may be adjusted to and controlled at such a value as to maintain the pH of the solution within the carbonation tanks at a desired value. Thus more uniform and efficient operation of the carbonation process is obtained than has heretofore been possible.

Furthermore, since the rate of flow of gas in pipe 36 is maintained by controller 48 at a substantially constant value, the uniformity of operation of the kiln 31 is improved because the amount of air drawn into the bottom of the kiln for combustion purposes is to some extent regulated. This regulation of intake air gives a more uniform lime burning zone within the kiln and helps to prevent such difficulties in the operation of the kiln as arching of the limestone, under-burning and over-burning of the limestone, and the like. Furthermore, in providing more uniform conditions within the kiln for the lime-burning process, it maintains the carbon dioxide content of the exhaust gases from the kiln at a more nearly constant value. Thus not only the volume but also the weight of carbon dioxide passing through the carbonation liquor in a given unit of time is more nearly constant and results in more uniform carbonation of the sugar solution, thus holding the pH of the solution at a more nearly constant value.

As noted above, the apparatus shown in the drawing may be used for batch carbonation. In batch operation, the tanks 12, 13, and 14 are filled with limed sugar solution and gas is supplied to the tanks in the same manner as described above. When the precipitation has taken place to the desired extent, the solution and precipitate are pumped from the tank and a new batch pumped in. Draw-off pipes 54, 55, and 56, together with the necessary shut-off valves, are provided in transfer pipes 15, 18, and 19 for use in batch operation so that the tanks may be emptied independently of one another.

In batch operation, there is an interval between the end of one batch and the beginning of another batch when the gas flowing through pipe 38 must be vented to the atmosphere and a pipe 57 and shut-off valve 58 are provided for this purpose. Such a vent is necessary because the flow of gas from the kiln must be maintained continuously in order that sufficient air may be introduced into the kiln to support and maintain combustion. If the controller 48 were not provided, this venting operation would tend to cause relatively wide variations in the pressure in pipe 38 and thus tend to vary the rate of production of gas in the kiln 31. The controller 48 maintains the volume of gas flowing in pipe 38 and hence the volume of air supplied to the kiln constant irrespective of whether vent valve 58 is open or closed and thus gives more uniform operation of the kiln.

From the above description it should be apparent that the present invention provides an improved method and apparatus for more uniformly and efficiently controlling the carbonation of a limed sugar solution. Since many embodiments might be made of the above invention and since many changes might be made in the embodiment disclosed, it is to be understood that all matter herein disclosed is to be construed as illustrative only and not in a limiting sense.

I claim:

1. In apparatus for carbonating a limed sugar solution, in combination, a carbonating unit comprising one or more containers for said solution, a source of carbon dioxide containing gas at a variable pressure, a conduit for conducting said gas from said source to said carbonating unit, means for measuring the flow of gas in said conduit, and means responsive to said flow of gas for maintaining the flow in said conduit at a desired value.

2. In apparatus for carbonating a limed sugar solution, in combination, a carbonating unit comprising one or more containers for said solution, a source of carbon dioxide containing gas at a variable pressure, a conduit for conducting said gas from said source to said carbonating unit, and a flow controller responsive to the flow of gas in said conduit for maintaining said flow of gas at a desired value.

3. A method of partially refining an unrefined sugar solution which comprises the steps of adding to said solution at a predetermined constant rate a quantity of lime suspension, supplying a carbon dioxide containing gas from a kiln to said solution to form a precipitate to remove impurities from said solution, measuring the flow of said gas to said solution, and controlling the measured flow of said gas at a predetermined constant rate which is in predetermined relation with the rate at which said lime suspension is added to said solution.

4. In apparatus for carbonating a limed sugar solution, in combination, a carbonating unit comprising one or more containers for said solution, a kiln for supplying carbon dioxide containing gas to said carbonating unit, a conduit connecting said kiln and said carbonating unit, and a flow controller responsive to the flow of gas in said conduit for maintaining said flow of gas at a substantially constant desired value whereby the pH of said solution is maintained at a substantially constant value.

WILMOT H. KIDD.